Oct. 25, 1966    L. B. HENLEY    3,280,697
METHOD AND APPARATUS FOR CONVERSION OF DRAWINGS
Filed April 15, 1964    3 Sheets-Sheet 1
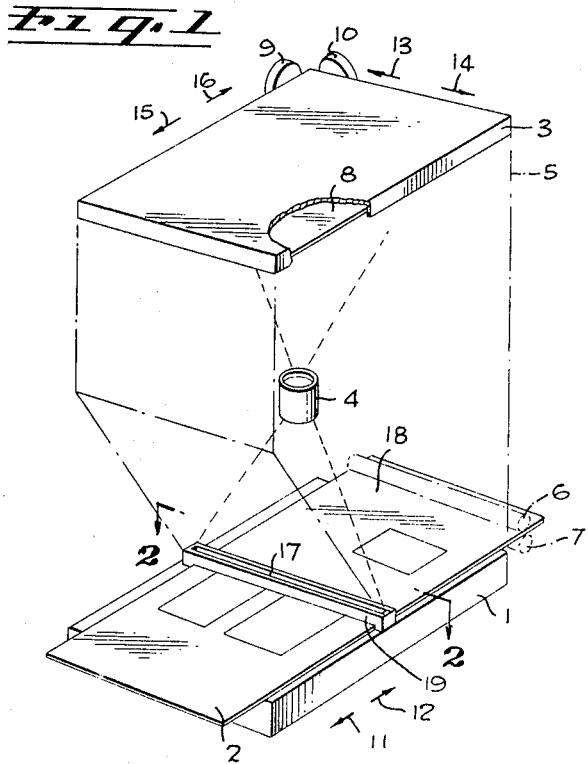
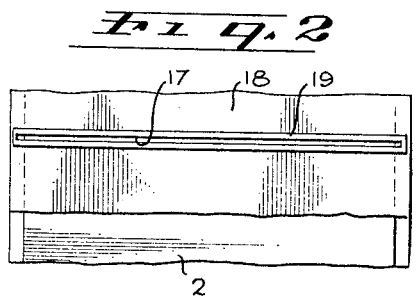
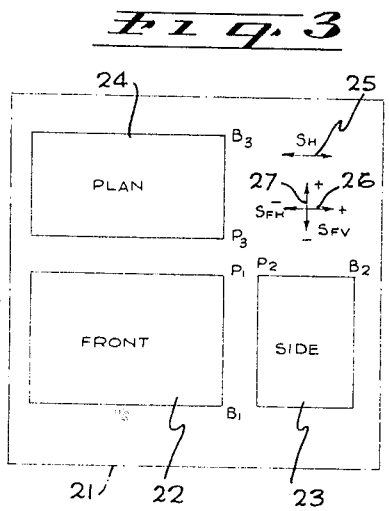
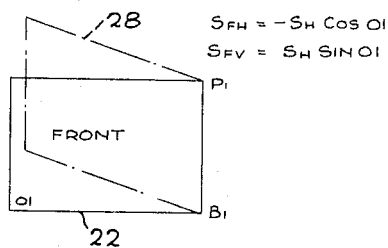
$S_{FH} = -S_H \cos O1$
$S_{FV} = S_H \sin O1$
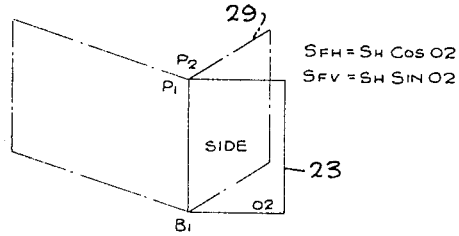
$S_{FH} = S_H \cos O2$
$S_{FV} = S_H \sin O2$
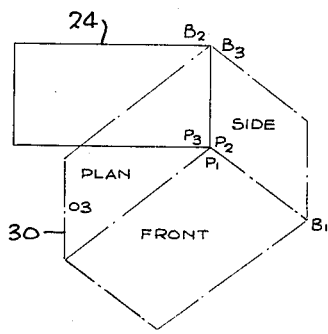
$S_{FH} = -S_H \cos O3$
$S_{FV} = -S_H \cos O3$
$O3 = 90°-O1-O2$
INVENTOR.
LYLE B. HENLEY
BY R. E. Beauger
ATTORNEY Oct. 25, 1966

L. B. HENLEY 3,280,697

METHOD AND APPARATUS FOR CONVERSION OF DRAWINGS

Filed April 15, 1964

INVENTOR.
LYLE B. HENLEY
BY R. E. Geangue
ATTORNEY

Oct. 25, 1966

L. B. HENLEY 3,280,697

METHOD AND APPARATUS FOR CONVERSION OF DRAWINGS

Filed April 15, 1964

INVENTOR.
LYLE B. HENLEY

BY

ATTORNEY

United States Patent Office 3,280,697
Patented Oct. 25, 1966

3,280,697
METHOD AND APPARATUS FOR CONVERSION OF DRAWINGS
Lyle B. Henley, Van Nuys, Calif., assignor to The Marquardt Corporation, Van Nuys, Calif., a corporation of California
Filed Apr. 15, 1964, Ser. No. 359,959
8 Claims. (Cl. 88—24)

This invention relates to graphic arts and more particularly to a novel and improved method for converting a multiview set of conventional two-dimensional engineering drawings to a three-dimensional drawing form of the axonometric or perspective view type.

In that branch of the graphic arts dealing with engineering drawings there are many requirements for axonometric or three-dimensional views such as isometric, dimetric, trimetric, perspective, and cutaway views of architectural and mechanical designs. These designs are generally formulated as sets of two-dimensional drawings, each set of which comprises a top view, a side view, and an end view. The top view is frequently referred to as a "plan" view, and the side and end views are frequently referred to as "elevation" views. These views are commonly arranged in sets having a uniform scale. The boundaries of these views are defined in terms of orthogonal lines since each view has but two dimensions which are referenced to orthogonal coordinates. The representation of a design in a three-dimensional view requires the addition of another axis (three in all) and further involves changes in the angles between the three boundary lines of the view, depending upon the system of projection or the vanishing point in a perspective view. The usual method for making a three-dimensional view is for a trained illustrator or draftsman to carefully re-layout the desired view in proper proportions from the set of two-dimensional original views. This requires both a considerable amount of skill and time.

By the present invention there is provided a novel means and method which obviates the illustration layout step required heretofore in the making of a three-dimensional axonometric or perspective view from a multiview set of two-dimensional orthographic original drawings. The novel means and method of the invention replaces the time-consuming and difficult re-drawing of prior techniques with a photographic process which accurately reproportions the drawing to either an axonometric (isometric, dimetric, or trimetric) or perspective projection. This photographic process provides the illustrator with a machine-made layout permitting him, in most cases to merely trace the reproportioned drawing to provide the desired three-dimensional view. Even in the case of complex designs, the machine-made layout provides a complete layout guide which requires a minimum of drafting skills to provide a finished three-dimensional view.

The photographic layout guide is prepared directly from the original orthographic drawing by means of a camera means which selectively alters the projected axes of the original orthographic drawing. In a sense, the camera introduces a controlled type of distortion which transforms the orthographic view to an axonometric view by deforming the geometric relationships among the points comprising the view.

The three separate views of the orthographic original are photographed with suitable axial distortion and the three resulting photographic prints (either opaque or transparent as desired) are combined into a montage or composite which serves as the layout guide. The layout guide is used in creating a reproportioned three-dimensional drawing. In many instances, it is merely necessary for the illustrator to trace the reproportioned drawing from the layout guide without additions (such as hidden lines, etc.) or modifications. In other instances, where the subject matter of the design is unusually complex, the layout guide will provide all necessary proportions and dimensions required by the illustrator in recreating the drawing in terms of a three-dimensional view. Artistic skill and judgment are virtually obviated in preparing the recreated three-dimensional view.

It is therefore a principal object of the invention to provide novel and improved means for converting a set of two-dimensional drawings to a three-dimensional drawing.

Another object of the invention is to replace the manual illustration layout step required heretofore in the making of a three-dimensional isometric or perspective view from a multiview set of two-dimensional orthographic original drawings.

Still another object of the invention is to provide novel and improved engineering drawing techniques.

Still another object of the invention is to provide a novel and improved means and method for the preparation of architectural and mechanical drawings.

Yet another object of the invention is to provide novel and improved means for the projection of graphic material from one coordinate system to another coordinate system.

It is still another object of the invention to provide a novel and improved method of arranging in one composition pictorial elements taken from a plurality of sources so that the elements are both distinct and combined into a whole, through novel superimposition techniques.

A general object of this invention is to provide a novel and improved optical conversion method and apparatus therefor which overcomes disadvantages of previous methods and means heretofore intended to accomplish generally similar purposes.

Another object of the invention is the improvement of mechanical drafting, generally.

These and other objects of the invention will be understood more completely from the following detailed description, taken in conjunction with the drawings in which:

FIGURE 1 is a somewhat diagrammatic illustration of a moving-plane camera of the type useful in carrying out the novel method of the invention.

FIGURE 2 is a sectional view of the apparatus of FIGURE 1 taken along line 2—2.

FIGURE 3 illustrates a set of two-dimensional multiview orthographic original drawings of the type suitable for use as source drawings in the practice of the method of the present invention.

FIGURE 4 is a geometrical diagram illustrating the development of the projection of the drawing of the front view of the set of FIGURE 3.

FIGURE 5 is a geometrical diagram illustrating the development of the projection of the side view of the set of FIGURE 3.

FIGURE 6 is a geometrical diagram illustrating the development of the projection of the plan view portion of the set of FIGURE 3.

Figure 7:
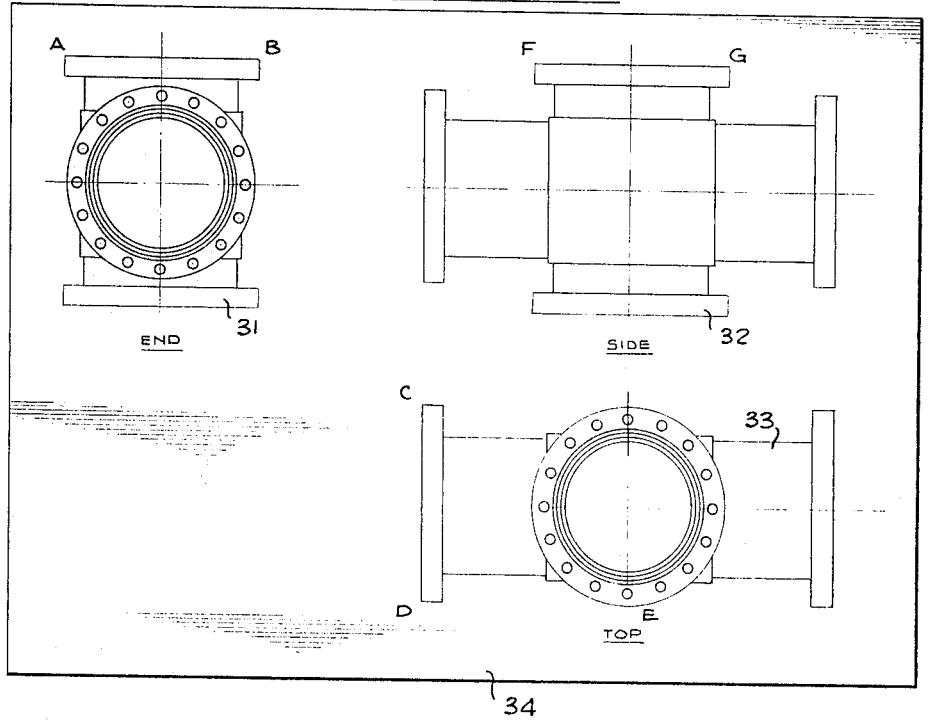
FIGURE 7 illustrates a conventional two-dimensional multiview set of orthographic drawings prior to its conversion to an axonometric drawing by the method and apparatus of the invention.

As referred to hereinabove, the method aspect of the present invention involves photographing an original two-dimensional multiview set of orthographic drawings by means of a camera which will introduce a desired type of image deformation into the photographed of the drawings. This deformation may be considered as a kind of axis conversion or projection in which selected base lines of the orthographic view are changed so that they appear as they would be seen from a new viewpoint. The plan and elevation views are individually photographed, each with a specific degree of deformation and subsequently combined into a single composite layout guide. This layout guide comprises a montage in which pictorial elements are borrowed from the three separate photographs and arranged in one composition so that the elements are both distinct and blended into a whole, through superimposition techniques. The layout guide will serve to provide the illustrator with the necessary layout proportions and dimensions necessary to draw a perspective or three-dimensional view.

The method of the invention is not dependent upon a camera of a particular construction, since any means which will provide the necessary image distortion or projection required in the making of the layout guide montage, may be used. By way of example only, a suitable camera mechanism will now be described in such detail as is deemed sufficient to enable those skilled in the art to practice and make use of the invention.

Looking at FIGURE 1, a suitable camera is shown which comprises a horizontally disposed easel 1 upon which the drawing 2 to be photographed is movably supported, a movable film holder 3, an objective lens 4, and a suitable light-tight housing 5. The drawing to be photographed is placed on easel 1 in such a manner as to engage drive rollers 6 and 7 which thereby enables the drawing 2 to be translated in either of two directions as indicated by arrows 11 and 12. Suitable drive means (not shown) such as a variable-speed reversible electric motor may be used to turn the drive rollers 6 and 7.

A photographic film 8 is fixably supported within a movable film holder 3 which in turn is provided with drive means 9 and 10. The film holder 3 is so arranged as to permit the entire sensitive surface of film 8 to face lens 4. The drive means 9 and 10 may comprise variable-speed, reversible electric motors and leadscrew mechanisms which will permit film holder 3 to be translated orthogonally in four directions as indicated by arrows 13–16, at any desired speed. A slit aperture 17 in mask 18 permits a line element of drawing 2 to be scanned by lens 4 and projected onto the film 8, upon relative movement between the drawing 2 and the film 8.

Slit aperture 17 is also shown in FIGURE 2 and comprises a narrow transverse opening in mask 18 which may, if desired, have a small upwardly extending wall portion 19 which surrounds the aperture 17 in order to block any extraneous light rays. Lens 4 may be any suitable objective lens capable of projecting an image of the portion of drawing 2 which is visible through slit aperture 17. The projected image may be projected at full size or lens 4 may reduce the image size if desired, as will become apparent.

Not shown in FIGURES 1 and 2 are means for illuminating the drawing and controlling the speed and direction of drive rollers 6 and 7, and drive means 9 and 10, these being of any suitable and well-known construction. By way of example only, easel 1 may be provided with a translucent sheet which is illuminated from below whereby upwardly projected light rays, passing through the easel, may be transmitted through the drawing 2 to facilitate projection of an image therefrom. Alternate means for illuminating the drawing by reflected light, as would be necessary for sheets having drawings on both sides, may be provided, as will be obvious to those versed in the art. The drive means should also include suitable speed control apparatus, of any suitable and well-known construction, for regulating the rate of displacement of the drawing 2, and the film holder 3, respectively. The speed and direction of movement of the film holder 3 must be made independently adjustable with respect to the speed and direction of easel 1, for reasons which will appear hereinafter.

Slit aperture 17, mask 18, and easel 1 preferably are relatively fixed with respect to drawing 2, although it should be understood that as an alternative construction easel 1 may be made movable in which case drawing 2 would be secured thereto. This arrangement permits drawing 2 to be moved beneath aperture 17 in the manner required to expose a continuous succession of line elements of drawing 2 onto film 8. That is, the drawing 2 is scanned in much the same way that the slit in the well-known focal plane camera shutter scans an image, except that in this instance the slit remains stationary and the object being scanned is moved.

The operation may be better understood by assuming that the drawing 2 is moving in the direction of arrow 11 and film 8 is moving in the direction of arrow 15. If the drawing 2 and the film 8 are moving at the same rate of speed and in the same direction, the drawing 2 will be photographed essentially in its original form on the film 8 since all line elements of the drawing 2 viewed through slit aperture 17 are copied onto the film through the slit. However, if there is a difference in the speed between the drawing 2 and the film 8, then the image exposed onto film 8 will differ from the original drawing 2. If, for example, the film 8 travels at a slower rate of speed than the drawing 2, but in the same direction, the image of the drawing 2 which is photographed onto the film 8, will be compressed along the direction of the axis which coincides with the direction of the film and drawing motion. The degree of compression of the photographed image will be directly proportional to the difference in relative speeds between the film 8 and the drawing 2. This is analogous to the well-known image compression effect experienced when photographing a moving object with a camera having a focal plane shutter, wherein the object and the shutter aperture move in the same direction but in which the shutter moves faster than the object. This principle is employed to obtain oblique image deformation, rather than simple image compression as just described, in order to accomplish the method of the invention. It will be appreciated that the film may be translated in a direction transverse to the direction of movement of drawing 2, by means of drive means 9 or 10. Also, a vector component may be obtained by simultaneously operating drive means 9 and 10. As can be seen, slit aperture 17 scans the drawing 2 as it moved in the direction of arrow 11 and the scanned information comprising successive line elements of drawing image is projected onto the film 8. The loci of these line elements on film 8 are determined by the motion of the film 8. By moving the film 8 at a rate which is one-half the rate at which the drawing 2 is moved, all dimensions of the drawing 2 which extend in the same direction as the axis of direction of drawing movement will be compressed 50%; the width of the drawing image as seen by the film 8 will remain essentially unchanged.

As will be apparent to those versed in the art, lens 4 may be selected to have any appropriate power so that the overall scale of the image projected onto film 8 is a fraction or percentage of the size of the drawing 2; that is, lens 4 may provide a 50% reduction of the image with an additional 50% size reduction being made in the length of the image due to the relative motion of the film 8 and the drawing, without further reduction of the width of the image. Conversely, lens 4 may be selected to have such power as to provide magnification of the image projected onto film 8.

As mentioned hereinabove, means are provided for translating the film in the direction of arrows 13 and 14 which are orthogonal to the direction of translation of the drawing 2; thus, compression of the width of the drawing can also be made. However, to achieve the intended purpose of the invention, the film holder 3 is driven in two orthogonal directions, simultaneously, thus yielding a vector components of motion. In this manner, the desired modification of the photographed image may be affected.

This will become more thoroughly understood upon consideration of FIGURES 4–6 and the accompanying text.

In the interest of clarity, certain portions of the camera apparatus of FIGURE 1 have been omitted. In particular, the support means for lens 4, the means for illuminating drawing 2, and the speed regulating apparatus for the drawing 2 and film 8 driving means. These omitted elements may be of any suitable and well-known construction.

FIGURES 3–6 illustrate the steps in development of an isometric view from an original three-view set of drawings 21 by means of the above-described camera apparatus and the novel method of the invention. FIGURE 3 represents a conventional three-view set of orthographic drawings comprising a plan view 24, a front view 22, and a side view 23. A selected reference line is identified with each view in order to illustrate the relationship of the transformed views to the original views. The reference lines for the front, side, and plan views are identified by the letters $P_1$–$B_1$, $P_2$–$B_2$, and $P_3$–$B_3$, respectively. The horizontal speed of the drawing to be copied is identified as $S_H$ and related motion is along the axis indicated by arrow 25. The horizontal speed of the film is identified as $S_{FH}$ and is generated along axes indicated by arrow 26. The vertical speed of the film is identified by $S_{FV}$ and is generated along the axes indicated by arrow 27. By simultaneously generating motion along the axes indicated by arrows 26 and 27 a vector component may be obtained which will result in the film being moved obliquely relative to the drawing. As can be seen, the drawing 21 may be translated along one axis (25) whereas the film may be translated along orthogonal axes (26 and 27). The front view 22 of the engineering drawing 21 is photographed first having the camera drive means suitably programmed so that the horizontal and vertical speeds of the film ($S_{FH}$ and $S_{FV}$) and the drawing ($S_H$) conform to the following equations:

$$S_{FH} = -S_H \cos 01$$
$$S_{FV} = S_H \sin 01$$

The image recorded on the film will correspond to the dotted outline 28 shown in FIGURE 4.

Next the side view 23 is photographed onto a separate film indexing the side view 23 at points $P_2$–$B_2$ and driving the film and drawing 21 with speeds as indicated by the following equations:

$$S_{FH} = S_H \cos 02$$
$$S_{FV} = S_H \sin 02$$

The image recorded on this second film will correspond to the dotted outline 29 shown in FIGURE 5.

Finally, a third film is placed in the camera and the plan view 24 is photographed. In order to photograph the plan view 24, the third film is indexed at points $P_3$–$B_3$ and the third film is then driven in accordance with the following equations:

$$S_{FH} = -S_H \cos 03$$
$$S_{FV} = -S_H \cos 03$$
$$03 = 90° - 01 - 02$$

The resulting plan view recorded on the third film corresponds to the dotted outline 30 in FIGURE 6. The three films are suitably processed, after exposure, and the three resulting photographs are assembled into a montage or composite view as will now be described.

Then the resultant photographs 28–29 are assembled by trimming along reference lines $P_1$–$B_1$, $P_2$–$B_2$, and $P_3$–$B_3$ and bringing mating points, lines, and surfaces together so as to form the desired isometric or perspective view. The addition of photograph 28 to photograph 29 is shown in FIGURE 5, and the combination of all three photographs (28–30) is shown in FIGURE 6. As can be seen, reference points $P_1$ and $P_2$ are made to coincide in FIGURE 5 and points $P_1$, $P_2$, and $P_3$ are made to coincide in FIGURE 6. By also making $B_2$ and $B_3$ coincide, as shown in FIGURE 6, the assembled photographs will properly relate the obliquely distorted views of the photographs and conform to the desired isometric view. This assembled photographic montage corresponds to the dotted outline portion of FIGURE 6 and is subsequently used as a layout guide which may be traced by an illustrator so that any extraneous lines of the original views, appearing in the photographic montage, may be eliminated or extra detail added, as desired. A tracing can be made directly from the montage by placing a tracing paper overlay on the montage and tracing it. It should be understood that it is not absolutely necessary to physically assemble the separate photographs (28–30) into a montage, since the final tracing may be made by sequentially tracing the individual photographs in appropriate relative positions on the final tracing.

While the above described example illustrates the salient features of the invention, a more comprehensive example will now be described. FIGURE 7 is a typical engineering drawing 34 of a valve housing assembly of the type comprising a three-view set of orthographic views wherein 31 corresponds to the end view, 32 corresponds to the side view, and 33 corresponds to the top view.

Figure 8:
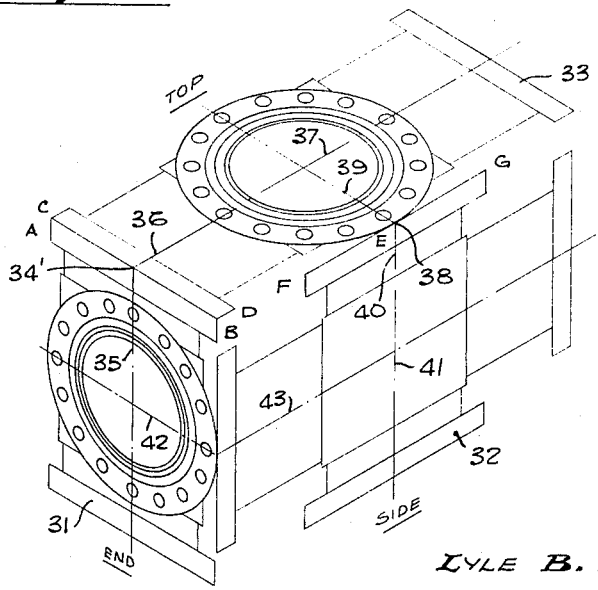
FIGURE 8 illustrates the layout guide developed by the invention from the drawing set of FIGURE 7.
Figure 9:
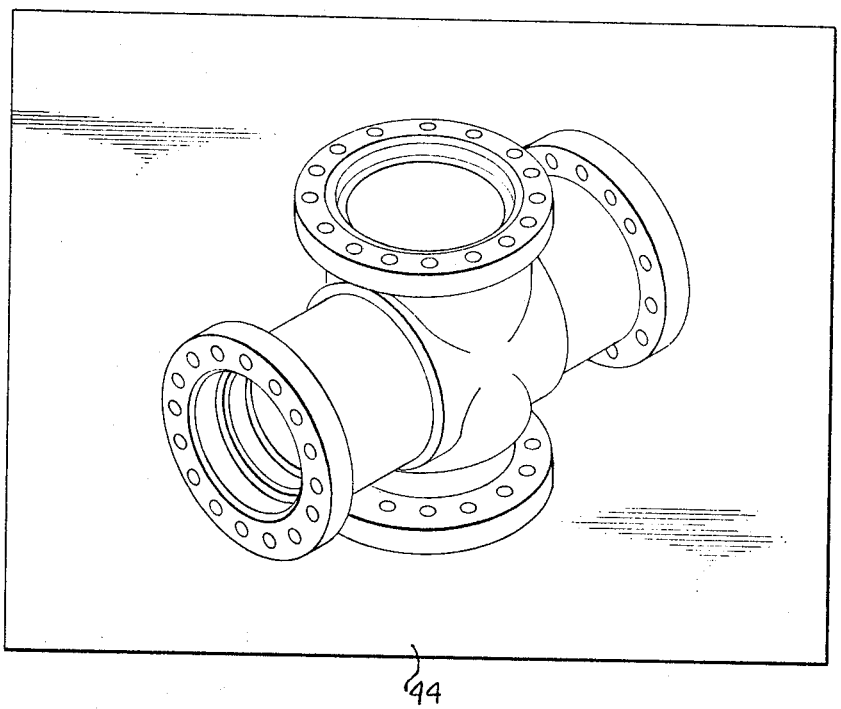
FIGURE 9 illustrates a completed axonometric drawing developed from the layout guide of FIGURE 8.

FIGURE 8 shows the assembled montage of oblique photographs comprising the layout guide obtained by photographing each of the three views of FIGURE 7 by means of camera apparatus of the type described hereinabove. Reference line A–B of end view 31 is superimposed on reference line C–D of top view 33, and reference point E of top view 33 is superimposed on the midpoint of reference line F–G of side view 32 in order to result in the layout guide shown in FIGURE 8. As can be seen, this will result in the horizontal and vertical centerlines of the various views being brought in mutual alignment. For example, the upper terminus 34' of centerline 35 of end view 31 is made to intersect the left-hand terminus 36 of centerline 37 of top view 33. Similarly, the lower terminus 38 of centerline 39 of top view is made to intersect the upper terminus 40 of the centerline 41 of side view. This will necessarily result in intersection of centerline 42 of the end view 31 with the centerline 43 of the side view 32. The final isometric view made by tracing the layout guide of FIGURE 8 is shown in FIGURE 9. It will be appreciated that the montage of FIGURE 8 is merely a guide which is used to produce the drawing of FIGURE 9. However, the spacing between all centerlines is correctly proportioned in the layout guide and it is merely necessary to use conventional ellipse templates and a straight edge to implement the view of FIGURE 8 to result in the view of FIGURE 9. No proportioning by dividers, etc. is required.

Cutaway views may be made in the same manner except that an orthographic cross-section view is used in place of the side view. The resultant composite will be correctly proportioned and only the cutaway details will need to be added.

Other axonometric projections (e.g., dimetric, and trimetric) are produced in the same manner as the isometric view used in the above described example.

Since certain changes may be made in the method described hereinabove without departing from the scope of the invention herein involved, it is intended that all matter contained in the above description or shown in the accompanying drawings shall be interpreted as illustrative and not in a limiting sense. For example, an alternate method of obtaining the views having the required image deformation is to project the drawings onto a plane surface by means of a distortion camera lucida. Each of the three views is then traced directly from the projected image.

While the features of the invention have been described with reference to particular examples it will be understood that various omissions and substitutions and changes in the steps of exemplary processes may be made by those skilled in the art, without departing from the spirit of the invention; therefore, it is intended that the invention

What is claimed is:
1. The method of converting a three-view set of planar orthographic drawings to a single view axonometric drawing, comprising the steps of:
   projecting an oblique view of each of said orthographic drawings onto an image plane which is coplanar with the plane of said drawings to provide a corresponding set of oblique projections;
   graphically copying each of said oblique projections, at said image plane, in mutual juxaposition so that adjacent image boundaries are substantially contiguous.

2. The method as defined in claim 1 wherein said projecting step includes:
   producing a planar photographic record of said projections at said image plane; and said copying step includes
   arranging said records so that at least one image boundary of each of said projections is in juxtaposition with an adjacent projection.

3. The method as defined in claim 2 wherein said copy step comprises:
   manually tracing the dominant boundaries of the images of said arranged records onto a record sheet which lies in the plane of said image plane.

4. The method of transforming a plurality of two-dimensional graphic views of a given subject taken from distinct aspects into a single three-dimensional graphic view, comprising the steps of:
   projecting a distorted image of each of said two-dimensional views onto an image plane which is coplanar with the plane of said two-dimensional views to change the orthogonal coordinates thereof to non-orthogonal coordinates having angular relationships determined by the viewing angle of said three-dimensional view;
   combining said non-orthogonal projected views into a caplanar composite layout guide view; and graphically copying said layout guide view onto a planar record to define the limits and boundary relationships of said three-dimensional view.

5. The method of converting a three-view set of planar orthographic engineering drawings to a single-view axonometric drawing comprising the steps of:
   photographing an oblique view of said set of orthographic drawings at a given image plane which is coplanar with the plane of said drawings to provide a corresponding set of photographs each having angular deformation of the image thereon as compared with the image of said orthographic drawings;
   assembling said set of photographs into a single coplanar montage so that the image of any one of said photographs has a boundary which is substantially contiguous with a boundary of the image of an adjacent photograph; and
   graphically copying the lines of congruence and the outline of said montage to define said single-view axonometric drawing.

6. The method of converting a three-view set of planar orthographic engineering drawings to a single-view axonometric drawing comprising the steps of:
   scanning each view of said set of planar orthographic drawings through a rectilinear slit aperture along a given axis while projecting said scanned image onto a photographic record, coplanar with the plane of said drawings, having a relative motion which is oblique with respect to said axis;
   assembling the three photographic records into a single coplanar montage by superimposing a common reference point of each of said photographic records and aligning the boundaries of adjacent photographic records into substantially contiguous alignment; and
   graphically copying the lines of congruence of said montage to provide an axonometric outline view.

7. The method of transforming an orthographic view to an oblique view, comprising the steps of:
   transporting said orthographic view past a line scanning slit in a first direction; projecting successive line elements from said scanning slit for recording on a photographic film while simultaneously transporting said film along two orthogonal coordinates, one of which extends in the same direction as said direction of transport and the other of which is transverse to said direction of transport.

8. An optical device comprising;
   a horizontally disposed easel having an upper surface adapted to receive a drawing; first drive means adjacent said easel for rectangularly transporting said drawing over said surface;
   movable camera means spaced apart from and facing said surface for recording an image of said drawing;
   fixed scanning means for projecting images of successive line elements from said drawing, during transport thereof, to said camera means; and
   second drive means coupled to said camera means for angularly moving said camera means with respect to the direction of transport of said drawing, thereby providing deformation of the image of said drawing recorded by said camera means.

References Cited by the Examiner
UNITED STATES PATENTS 2,462,150  2/1949  Wilkinson _____ 88—24
3,126,809  3/1964  Adams, et al. _____ 95—75

NORTON ANSHER, *Primary Examiner.*

R. A. WINTERCORN, *Assistant Examiner.*